United States Patent [19]
Glehr

[11] Patent Number: 5,723,911
[45] Date of Patent: Mar. 3, 1998

[54] KEYLESS ACCESS CONTROL DEVICE

[75] Inventor: Manfred Glehr, Neutraubling, Germany

[73] Assignee: Siemens Aktiengesellschaft, Munich, Germany

[21] Appl. No.: 405,840

[22] Filed: Mar. 17, 1995

[30] Foreign Application Priority Data

Mar. 17, 1994 [DE] Germany ............ 44 09 167.2

[51] Int. Cl.⁶ .................................. B60Q 1/00
[52] U.S. Cl. ................... 307/10.2; 307/10.3; 307/10.4;
307/10.5; 180/287; 340/825.72; 340/825.69;
340/825.54; 340/426; 364/424.045
[58] Field of Search ..................... 307/9.1–10.8;
180/287; 123/198 B, 198 DB, 198 DC,
179.1, 179.2; 340/425.5, 426, 429, 435,
438, 440, 480, 825.69, 825.72, 825.31,
825.34, 828.54, 534, 539; 364/424.045,
424.037, 423.098, 423.099

[56] References Cited

U.S. PATENT DOCUMENTS

| | | | |
|---|---|---|---|
| 4,484,183 | 11/1984 | Morey | 340/825.31 |
| 4,761,645 | 8/1988 | Mochida | 340/825.31 |
| 4,763,121 | 8/1988 | Tomoda et al. | 340/825.54 |
| 4,783,658 | 11/1988 | Nakano et al. | 340/825.54 |
| 4,805,722 | 2/1989 | Keating et al. | 180/287 |
| 4,897,630 | 1/1990 | Nykerk | 340/426 |
| 4,942,393 | 7/1990 | Waraksa et al. | 340/825.31 |
| 5,293,160 | 3/1994 | Kurozu et al. | 307/10.2 |
| 5,309,144 | 5/1994 | Lacombe et al. | 340/539 |
| 5,349,329 | 9/1994 | Smith | 340/539 |
| 5,432,495 | 7/1995 | Tompkins | 340/425.5 |

FOREIGN PATENT DOCUMENTS 0138090 10/1991 European Pat. Off. .

*Primary Examiner*—William M. Shoop, Jr.
*Assistant Examiner*—Peter Ganjian
*Attorney, Agent, or Firm*—Herbert L. Lerner; Laurence A. Greenberg

[57] ABSTRACT

A device for controlling keyless access to a motor vehicle includes a transceiver to be carried by a user. A distance detecting device measures a distance between the transceiver and a motor vehicle. A transmitting unit being disposed in the motor vehicle and being associated with a tripping device broadcasts a question code signal when the tripping device is actuated. The transceiver has a receiver for receiving the question code signal, and the transceiver has a transmitter for broadcasting an answer code signal only whenever the motor vehicle is located in the immediate vicinity of the transceiver. A receiving unit disposed in the motor vehicle receives the answer code signal from the transceiver and furnishes an unlocking signal to an unlocking unit if the answer code signal matches a set-point code signal.

8 Claims, 4 Drawing Sheets

KEYLESS ACCESS CONTROL DEVICE

BACKGROUND OF THE INVENTION

Field of the Invention

The invention relates to a remote-control keyless access control device for a motor vehicle, having a transmitting and receiving unit in the motor vehicle and a portable transceiver. An unlocking unit such as a central locking system can be controlled with the aid of a bidirectional dialog between the transmitting unit, the transceiver and the receiving unit.

Such an access control device is known from European Patent Specification No. 0 138 090 B1. In that device, a portable transceiver and a stationary transmitting/receiving unit disposed in a motor vehicle are used with a question and answer dialog in order to test a vehicle user and to unlock the vehicle if the user is authorized. The security of the dialog against eavesdropping is assured by means of a different range of the transmitted and the received signals.

However, such a device can also be intercepted. Such a deception will be described in further detail with reference to FIG. 1.

SUMMARY OF THE INVENTION

It is accordingly an object of the invention to provide a keyless access control device, which overcomes the hereinafore-mentioned disadvantages of the heretofore-known devices of this general type and which offers high security against unauthorized access.

With the foregoing and other objects in view there is provided, in accordance with the invention, a device for controlling keyless access to a motor vehicle, comprising a transceiver to be carried by a user; a distance detecting device measuring a distance between the transceiver and a motor vehicle; tripping means; a transmitting unit being disposed in the motor vehicle and being associated with the tripping means for broadcasting a question code signal when the tripping means are actuated; the transceiver having a receiver for receiving the question code signal, and the transceiver having a transmitter for broadcasting an answer code signal only whenever the motor vehicle is located in the immediate vicinity of the transceiver; an unlocking unit; and a receiving unit disposed in the motor vehicle for receiving the answer code signal from the transceiver and furnishing an unlocking signal to the unlocking unit if the answer code signal matches a set-point code signal.

Through the use of a transmitting unit disposed in the motor vehicle, a question code signal is broadcast when tripping means are actuated. A portable transceiver having a transmitter and a receiver is consequently activated and in turn transmits an answer code signal, if the vehicle is in the immediate vicinity of the transceiver. This is ascertained by means of a distance measurement that is brought about by the transceiver or by a control unit disposed in the vehicle.

A receiving unit in the motor vehicle furnishes an unlocking signal to an unlocking unit, if the answer code signal matches a set-point code signal.

In accordance with another feature of the invention, in order to carry out distance determination, the transceiver has a distance detecting device which broadcasts ultrasound or UHF signals and whose reflected signals are received by the transceiver. The distance can be calculated from the transit time of the signals.

In accordance with a further feature of the invention, the transceiver also has an inductive receiver with an associated oscillating circuit, which ascertains the presence of the motor vehicle in the manner of a metal detector.

In accordance with an added feature of the invention, the tripping device is a door handle being electrically connected to the transmitting unit.

In accordance with a concomitant feature of the invention, the distance detecting device is disposed in the transceiver and/or in the control unit.

Other features which are considered as characteristic for the invention are set forth in the appended claims.

Although the invention is illustrated and described herein as embodied in a keyless access control device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
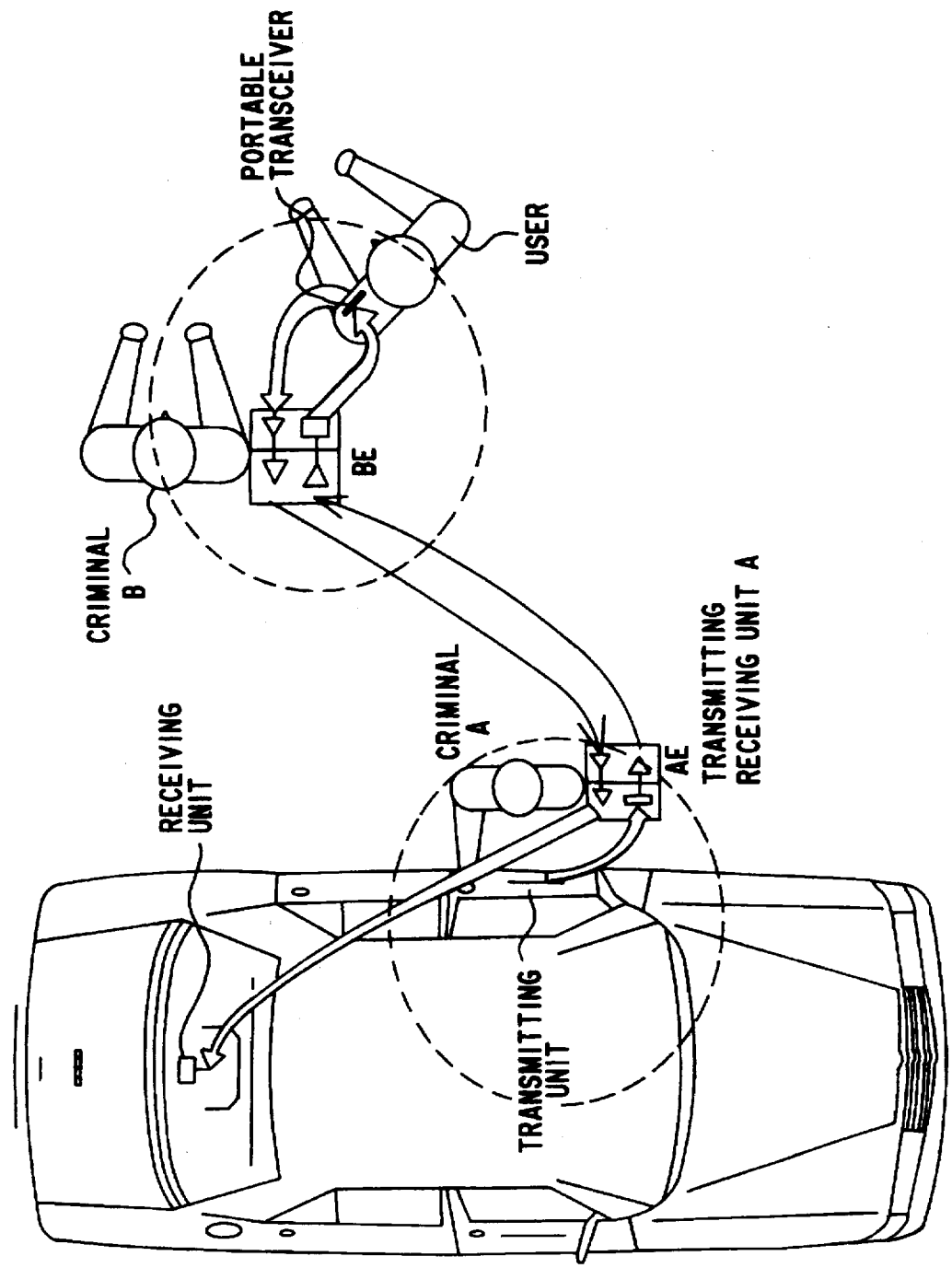
FIG. 1 is a diagrammatic, top-plan view of a motor vehicle as seen upon the occasion of unauthorized access.

Referring now to the figures of the drawing in detail and first, particularly, to FIG. 1 thereof, there is seen an illustration of a deception being used to intercept an access control device, in which an authorized user, carrying his or her authentication medium (referred to herein as a transceiver) with him or her, has locked the vehicle and moved away from it. A first criminal A goes to the vehicle, while a second criminal B stays in the vicinity of the authorized user. Each of the two criminals carries a portable transmitting and receiving unit AE or BE with him or her. Each of the units AE or BE can receive signals and can transmit a received signal through the other respective device either to the motor vehicle or to the transceiver.

If the criminal A actuates tripping means (such as a door handle), then a bidirectional question and answer dialog between the motor vehicle and the transceiver is set in motion, with the purposeful detour by way of the two transmitting and receiving units AE and BE. In the normal situation, it is understood that the signals of the transceiver would no longer reach the vehicle, since the transceiver is too far away from the vehicle. Nevertheless, the criminal A can now enter the vehicle without authorization and can start it.

The system of FIG. 1 is a conventional state of the art theft prevention system which can be overcome by two thieves in cooperation. Both of the criminals A and B thereby carry a transmitting/receiving unit AE and BE, which can receive very wide broad-band signals and which can further transmit the received signals. For instance: when the criminal A pulls on the door handle of the motor vehicle, then the motor vehicle transmits a challenge code signal. The user cannot receive the challenge code signal at that point, because he is too far away from the motor vehicle. The vehicle would in this case not receive a response code signal and, accordingly, the door locks would remain activated.

The criminal A, however, carries a transmitting/receiving unit AE, which receives the challenge code signal and forwards the same to the transmitting/receiving unit BE of the criminal B. The challenge code signal which is received by the criminal B is now forwarded to the user. The criminal B is located in the close vicinity of the user and so the challenge code signal actually arrives at the portable transceiver. The transceiver, upon having received the correct challenge code signal, returns a response code signal. The response code signal could, in the normal case, not reach the vehicle, because the signal is sent out with a limited reach. Due to the fact, however, that the criminal B is located in the close vicinity of the user, the transmitter/receiver unit BE is enabled to receive the response code signal and to forward the same to the transmitter/receiver unit AE carrier by the criminal A. The unit AE then forwards the correct response code signal to the motor vehicle, where it is compared with the stored code signal. At this point, the signals correspond and the door locks are deactivated. The criminal A can now enter the vehicle, even though the user had no intention to allow such entry.

The transmitting/receiving units AE and BE are conventional receivers and transmitters operating on broad-band signals. Such signals are received, amplified, and transmitted without a change. Due to the fact that the admissible frequency range for challenge code signals and response code signals in the application in a theft prevention system for motor vehicles is well known, it is very easy to construct such transmitter/receiver units accordingly. It is thus possible to largely extend the reach of the challenge code signals and the response code signals by means of the transmitter/receiver units AE and BE, even though the transmitter unit in the motor vehicle or the transmitter in the portable transceiver send signals only with very short reach.

Figure 2:
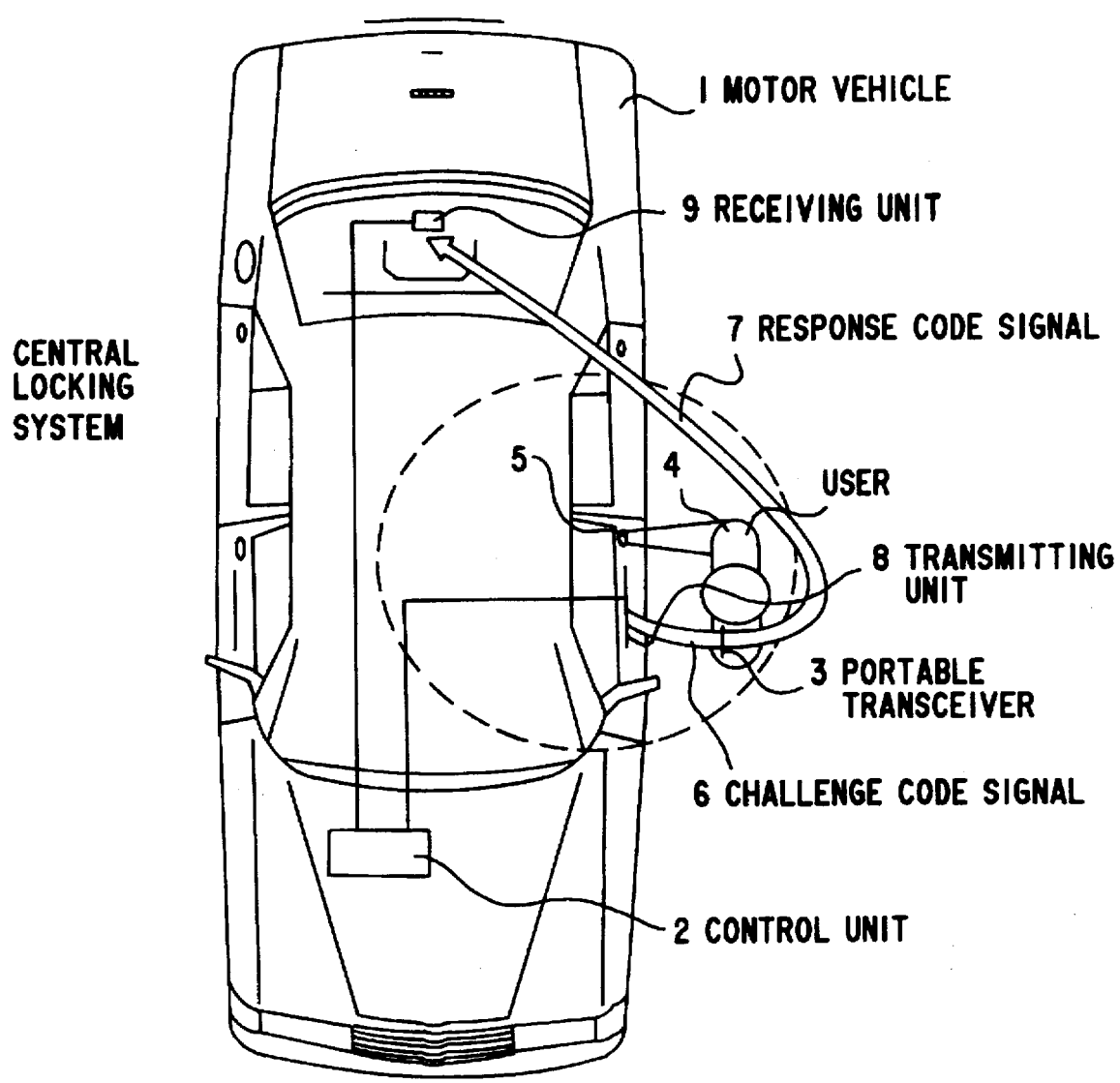
FIG. 2 is a top-plan view of a motor vehicle with an access control device according to the invention.

A keyless, remote-control access control device will be described in detail below with reference to FIG. 2, while taking its use in a motor vehicle as an example. A control unit 2 with a transmitting unit and receiving unit is disposed in a motor vehicle 1. Through the use of a question and answer dialog, the control unit 2 can enter into wireless communication with a portable transceiver 3, which is located in a jacket pocket of the user 4 at some distance from the motor vehicle 1. In this dialog a test is performed as to whether or not the user 4 of the transceiver 3 is authorized to unlock or lock the vehicle 1.

By way of example, the control unit 2 is connected to tripping means, such as a door handle 5, which causes the control unit 2 to set a bidirectional, wireless question and answer dialog with the transceiver into motion.

Figure 3:
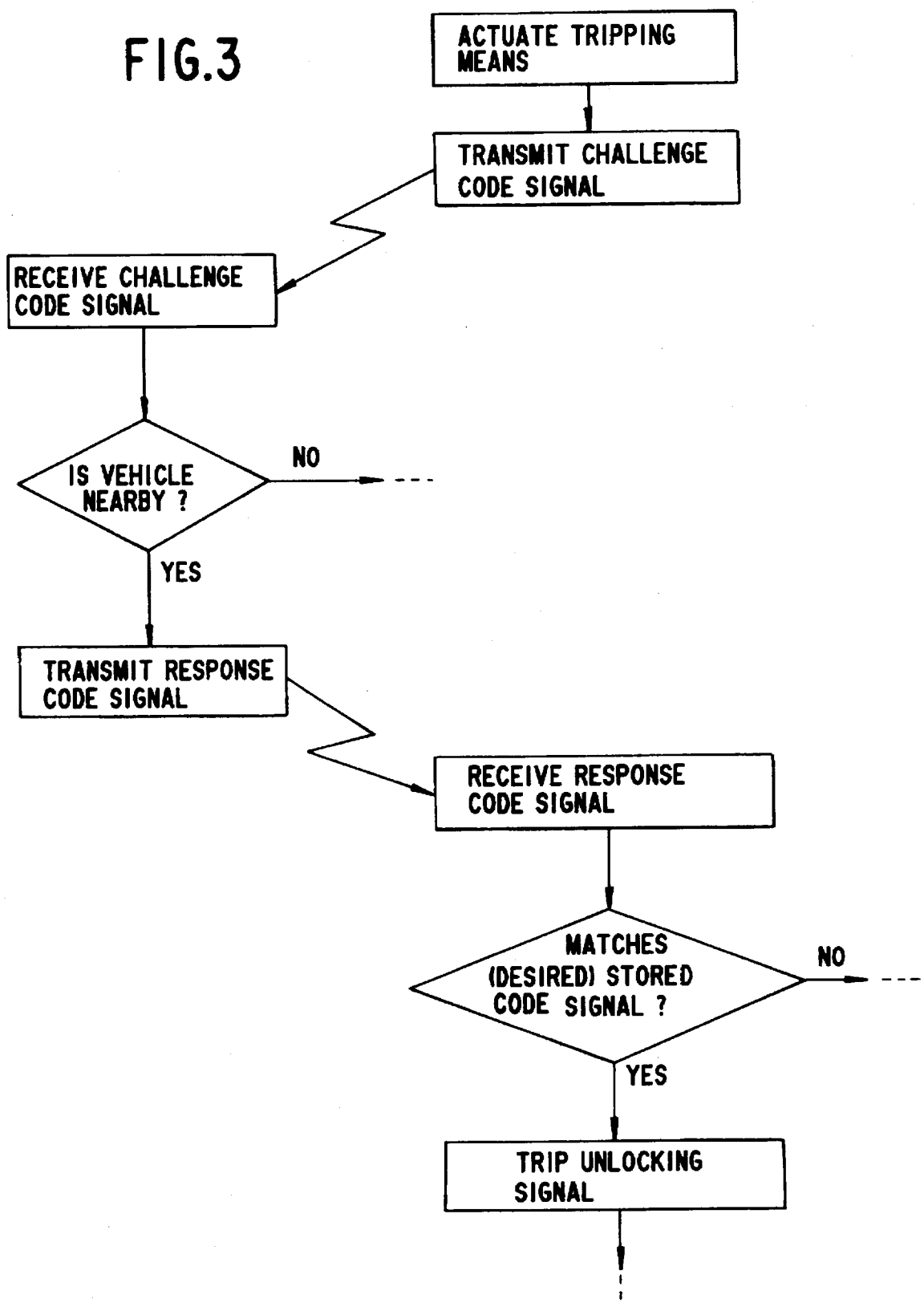
FIG. 3 is a flowchart of a question and answer dialog between a transceiver and a control unit.
Figure 4:
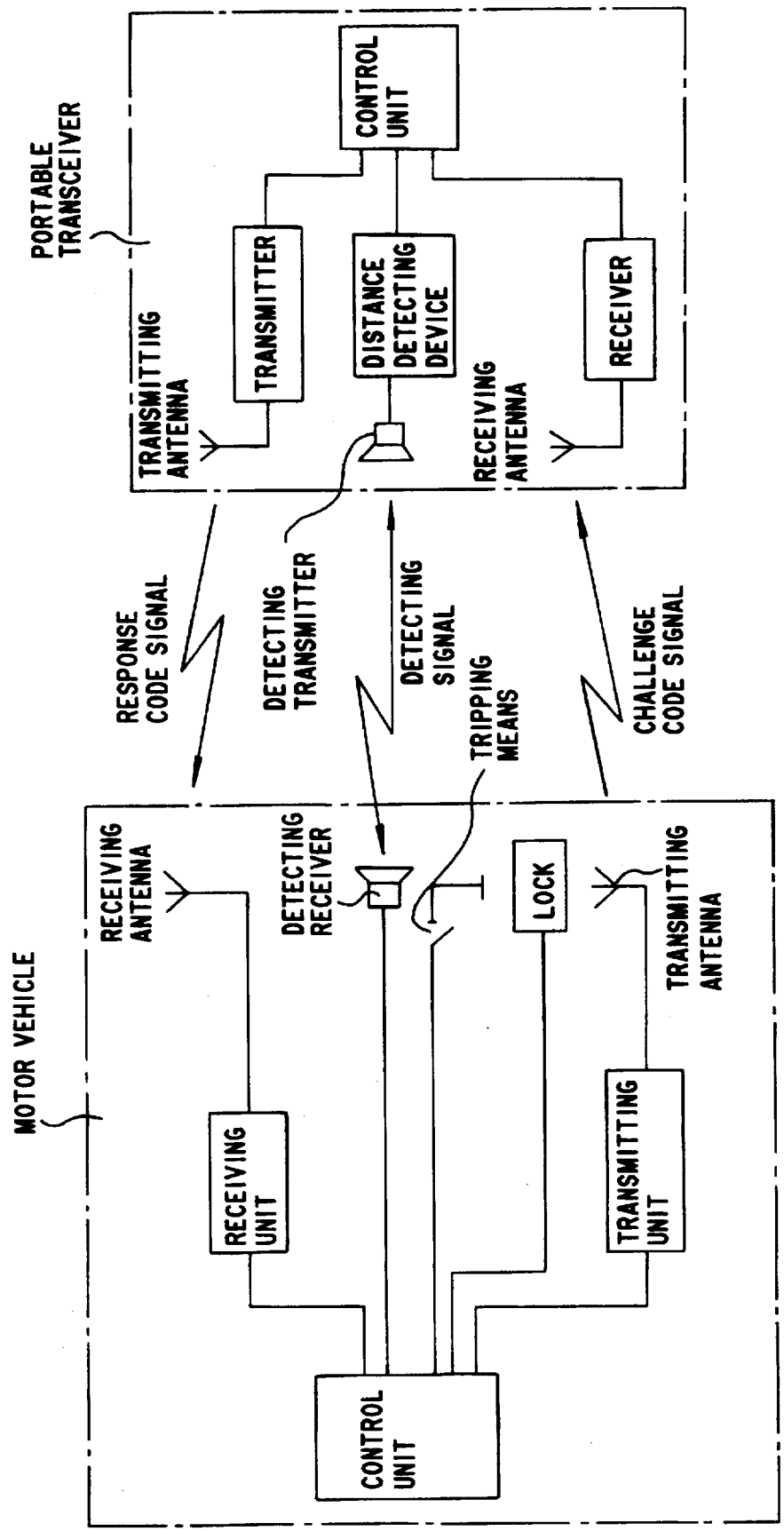
FIG. 4 is a schematic view of the interaction between the motor vehicle and the portable transceiver.

The question and answer dialog for unlocking or locking the vehicle 1 will be described in further detail below in conjunction with FIGS. 2 and 3. The door handle 5 acts as tripping means. After actuation of the tripping means, a transmitting unit 8 of the control unit 2 broadcasts a question code signal 6 (which is represented in the flowchart by a lightning-shaped arrow, since wireless transmission is involved). The question code signal 6 is received by the transceiver 3.

With the aid of a distance detecting device, the transceiver 3 thereupon checks whether or not the vehicle 1 is located in its immediate vicinity. If the vehicle 1 is close enough to the transceiver 3, then the transceiver broadcasts an answer code signal 7. If the vehicle 1 is not close enough, the question and answer dialog is discontinued. An alarm can also be issued if the distance from the vehicle 1 is too great and if an attempt is being made to gain access to the vehicle 1.

The answer code signal 7 is received by a receiving unit 9 of the control unit 2 and compared with an expected set-point or command code signal. If the user 4 of the transceiver is authorized, or in other words if the answer code signal matches the set-point code signal, then an unlocking signal is tripped. The vehicle 1 is thus unlocked.

In order to increase the security of the question and answer dialog against eavesdropping, the question code signal 6 and the answer code signal 7 can be changed continuously in accordance with a predetermined algorithm. Since the generation of code signals is not essential to the invention and is adequately well known per se, it will not be described in further detail herein.

The transmitting unit 8 is connected to one or more transmitting antennas, which are disposed in outside mirrors and/or in a rearview mirror or doors of the motor vehicle 1. The receiving antennas are disposed in such a way that they can receive signals from all directions. The transmitting antenna may also be disposed on the back end of the vehicle. The radio antenna may likewise serve as a receiving antenna for the receiving unit 9.

By way of example, a central locking system may be controlled by the receiving unit 9 as an unlocking unit. The unlocking unit is likewise accommodated in the control unit 2. The control unit 2 may be located at any arbitrary point in the motor vehicle 1. The control unit 2 along with the receiving unit 9, the transmitting unit 8, the central locking system, and as applicable at least a portion of the distance detecting device, is supplied with energy from the automobile battery.

The portable transceiver 3 in turn has a receiver and a transmitter, which are likewise supplied with energy from a battery, in the form of a round cell. The transmitter and the receiver can serve at the same time to measure the distance between the transceiver 3 and the vehicle 1. In other words, they can simultaneously be the distance detecting device. Alternatively, however, one additional transmitter and one receiver may be present, by means of which the distance is determined.

In order to determine the distance between the transceiver and the motor vehicle, the distance detecting device can broadcast UHF signals or ultrasound signals. The signals are reflected back to the transceiver 3 by the vehicle 1 or can be received by the control unit 2, amplified and transmitted back. The distance between the transceiver and the motor vehicle can be ascertained from the total transit time being measured.

If UHF signals are used to measure the distance, then because of the short transit times of approximately 10 ns, very high frequencies in the MHz or GHz range should be used. The transmitter and receiver then function similarly to the radar process.

The closeness of the vehicle 1 can also be ascertained by means of a coil with an associated oscillating circuit, which functions like a metal detecting device. Then the presence of the large metal mass of the motor vehicle 1 is ascertained.

The maximum allowable distance between the transceiver and the motor vehicle is determined on one hand by the shorter range of the question code signal 6 or of the answer code signal 7, or on the other hand by trial and error as to how far the transceiver 3 is allowed to be from the motor vehicle 1 for a user 4 to still reliably be furnished authorize access. Beyond that distance, no further access to the motor vehicle 1 is allowed to be possible. The maximum distance is approximately 1 to 2 m.

The control unit 2 in the motor vehicle 1 can at the same time have at least part of the distance detecting device and can broadcast ultrasound signals or UHF signals, which are received by the transceiver 3. The transceiver 3 reacts to these signals with an answer signal. The control unit 2 then calculates the distance between the transceiver and the motor vehicle from the transit time being measured, and decides from the transit time whether the question and answer dialog is to be continued or discontinued.

The transceiver 3 is preferably constructed in the form of a chip card or smart card. The transceiver 3 may also be in the form of a conventional key, in which the transmitter, receiver, voltage source, and at least part of the distance detecting device are disposed.

I claim:

1. A device for controlling keyless access to a motor vehicle, comprising:

a transceiver to be carried by a user;

tripping means;

a transmitting unit disposed in a motor vehicle and being associated with said tripping means for broadcasting a challenge code signal when said tripping means are actuated;

a distance detecting device for measuring a distance between said transceiver and the motor vehicle, said distance detecting device outputting a detecting signal independent of the challenge code signal and outputting a distance signal;

said transceiver having a receiver for receiving the challenge code signal, and said transceiver having a transmitter for broadcasting a response code signal only whenever the distance signal states that the motor vehicle is located in the immediate vicinity of said transceiver;

an unlocking unit; and a receiving unit disposed in the motor vehicle for receiving the response code signal from said transceiver and furnishing an unlocking signal to said unlocking unit if the response code signal matches a predetermined code signal.

2. The device for monitoring keyless access to a motor vehicle according to claim 1, wherein said distance detecting device has an ultrasound transmitter and an ultrasound receiver.

3. The device for monitoring keyless access to a motor vehicle according to claim 1, wherein said distance detecting device has a UHF transmitter and a UHF receiver.

4. The device for monitoring keyless access to a motor vehicle according to claim 2, wherein said distance detecting device has an inductive receiver with an associated oscillating circuit.

5. The device for monitoring keyless access to a motor vehicle according to claim 1, wherein said tripping device is a door handle being electrically connected to said transmitting unit.

6. The device for monitoring keyless access to a motor vehicle according to claim 1, wherein said distance detecting device is disposed in said transceiver.

7. The device for monitoring keyless access to a motor vehicle according to claim 1, including a control unit disposed in the motor vehicle, said distance detecting device being disposed in said control unit.

8. The device for monitoring keyless access to a motor vehicle according to claim 1, including a control unit disposed in the motor vehicle, said distance detecting device having one portion disposed in said control unit and another portion disposed in said portable transceiver.

* * * * *